UNITED STATES PATENT OFFICE.

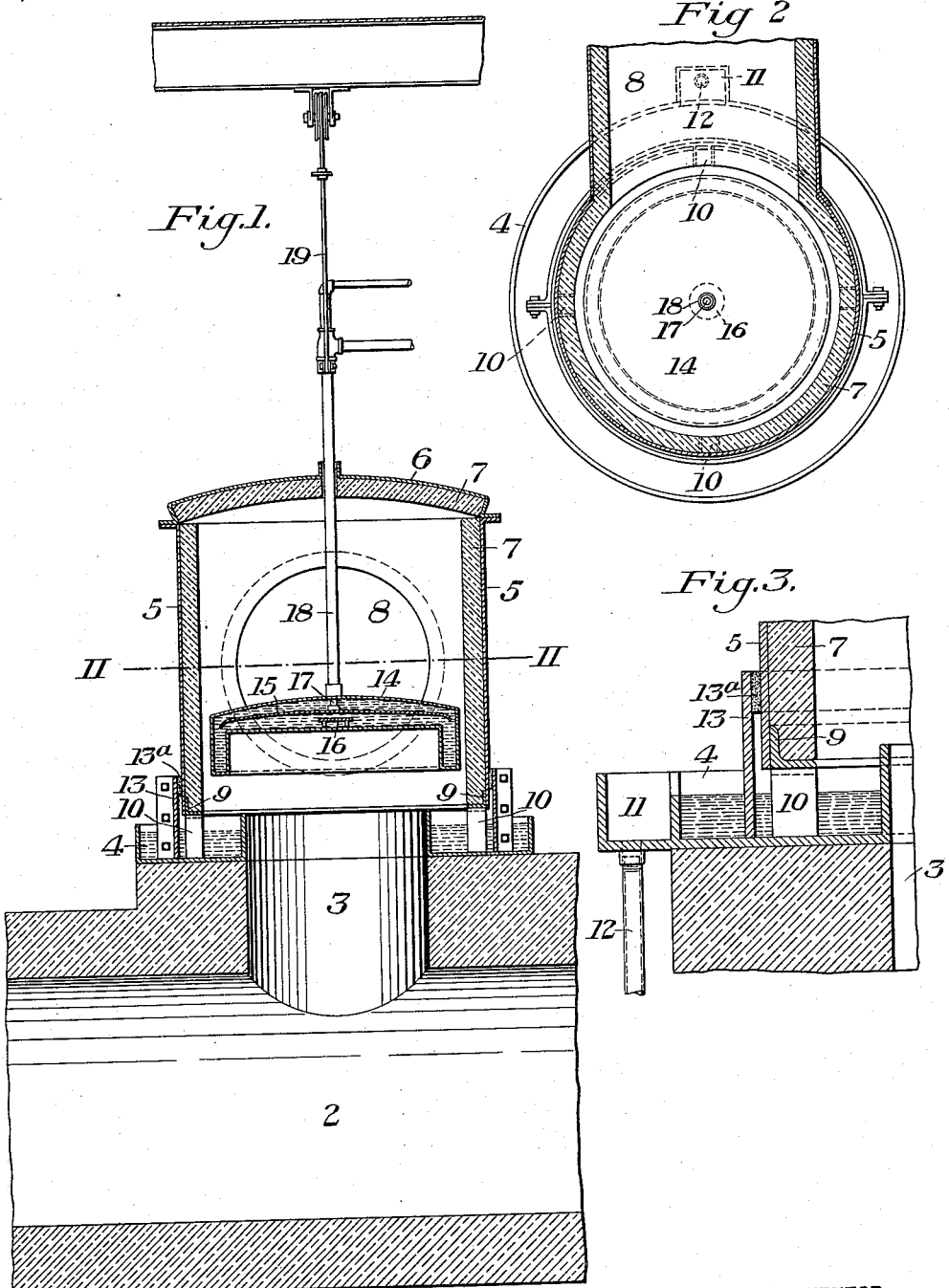

LUTHER L. KNOX, OF AVALON, PENNSYLVANIA, ASSIGNOR TO KNOX PRESSED AND WELDED STEEL COMPANY, OF PITTSBURGH, PENNSYLVANIA, A CORPORATION OF PENNSYLVANIA.

INTAKE-VALVE.

1,165,007.  Specification of Letters Patent.  Patented Dec. 21, 1915.

Application filed July 6, 1914. Serial No. 849,164.

*To all whom it may concern:*

Be it known that I, LUTHER L. KNOX, a citizen of the United States, residing at Avalon, in the county of Allegheny and State of Pennsylvania, have invented a new and useful Improvement in Intake-Valves, of which the following is a full, clear, and exact description, reference being had to the accompanying drawings, forming part of this specification, in which—

Figure 1 is a longitudinal vertical section of an intake valve embodying my invention. Fig. 2 is a section on the line II—II of Fig. 1, and Fig. 3 is a detail sectional view of a portion of the valve on a larger scale.

My invention has relation to intake valves for flues, and is particularly adapted for use as a gas intake valve in connection with the gas flues of a reversing regenerator furnace, although it may be used for other purposes.

The object of my invention is, to provide a simple and efficient form of water-cooled valve which can be readily seated upon the flue; which will form an efficient seal for the flue when closed; and in which the parts are so constructed and arranged that the sealing pan can be readily removed for cleaning or repairs.

The nature of my invention will be best understood by reference to the accompanying drawing in which I have shown a preferred embodiment thereof, and which will now be described, it being premised, however, that various changes can be made in the details of construction and arrangement of the several parts without departing from the spirit and scope of my invention as defined in the appended claims.

In these drawings the numeral 2 designates a flue having an intake port 3 extending through its top wall. Seated around this port and forming its upper portion is an annular water trough or pan 4.

5 designates a valve casing having a removable cap or cover 6, and consisting preferably of a metal shell with an inner refractory lining 7. This valve casing has a connection 8 opening into one side thereof and through which the gas enters the casing. The casing 5 is supported at its lower end by an angle 9 resting upon or secured to a plurality of spaced supports 10, which, in turn, rest within the annular pan or trough 4. The latter is provided at one side with an overflow extension 11 having an offtake pipe 12. Seated within the trough or pan and extending upwardly around the lower portion of the valve casing is a cylindrical wall 13 with a packing 13ª of asbestos or other refractory material seated between its upper portion and the adjacent outer shell of the valve casing.

14 designates the valve which consists of a hollow body with a depending hollow flange adapted to seat around the upper portion of the port 3 within the pan or trough 4. This valve has within its upper or body portion a baffle plate 15 below which is also preferably arranged a small baffle or strike plate 16. The stem of the valve consists of an inner hollow pipe or tube 17 and an outer surrounding pipe or tube 18. The inner pipe or tube extends through the baffle 15 and is arranged to direct cooling water directly against the baffle or strike plate 16. This latter is provided to prevent the water from tending to cut through the inner wall or shell of the valve. The water thus discharged spreads out and flows around the edges of the baffle 15 and thence upwardly and away through the outer pipe member 18.

19 designates any suitable actuating connection for raising and lowering the valve to unseat and seat it.

By raising the valve casing 5 and supporting it in its raised position in any suitable manner, the pan or trough 4 can be readily slid out from under it. This permits ready removal of the pan or trough for the purpose of cleaning, which is of importance owing to the fact that the flue gases cause the deposit of a considerable amount of tar or other carbonaceous products in the pan, tending to clog it up and fill it.

The entire structure is preferably designed to seat upon the upper surface of a flue wall, thus obviating any special setting within said wall.

I claim:

1. An intake valve structure, comprising, in combination with a flue having an intake opening, an annular water pan seated around and forming the mouth of said opening, a valve casing having a plurality of spaced supports secured to and depending below the lower end portion, and resting in said pan, a cylindrical sealing wall also seated in said pan and extending above the lower end of the valve casing, and a packing between the adjacent surfaces of said wall and casing, and a valve within the casing and also arranged to seat within the pan, substantially as described.

2. An intake valve structure, comprising, in combination with a flue having an intake opening, an annular water pan seated around and forming the mouth of said opening, a valve casing having a plurality of spaced supports secured to and depending below the lower end portion, and resting in said pan, a cylindrical sealing wall also seated in said pan and extending above the lower end of the valve casing, a packing between the adjacent surfaces of said wall and casing, and a valve within the casing and also arranged to seat within the pan, said casing having a refractory lining and being held by said supports above the water level in the pan, substantially as described.

3. An intake valve structure, comprising a water pan removably supported around the intake opening of a flue, a valve casing removably seated in said pan and having openings at its lower portion which communicate with the surrounding water space of the pan, said openings extending above the water level of the pan, a cylindrical sealing wall seated in the pan and surrounding the lower portion of the valve casing to a point above the top of said openings, and packing or sealing means between the said wall and casing; substantially as described.

In testimony whereof, I have hereunto set my hand.

LUTHER L. KNOX.

Witnesses:
GEO. B. BLEMING,
GEO. H. PARMELEE.

Copies of this patent may be obtained for five cents each, by addressing the "Commissioner of Patents, Washington, D. C."